UNITED STATES PATENT OFFICE.

PERCY NEYMANN, OF CHICAGO, ILLINOIS, ASSIGNOR TO ADAMS & ELTING COMPANY, OF CHICAGO, ILLINOIS, A CORPORATION OF ILLINOIS.

SURFACE FINISH.

No. 911,606.    Specification of Letters Patent.    Patented Feb. 9, 1909.

Application filed June 24, 1908. Serial No. 162,886.

*To all whom it may concern:*

Be it known that I, PERCY NEYMANN, citizen of the United States, residing at Chicago, county of Cook, State of Illinois, have invented a certain new and useful Improvement in Surface Finish, and declare the following to be a full, clear, and exact description of the same, such as will enable others skilled in the art to which it pertains to make and use the same.

My invention relates in general to finish for surfaces, and more particularly to finishes which simultaneously impart a color and a finish to the treated surfaces.

It has been common heretofore to simultaneously color and finish surfaces by applying thereto varnish containing the coloring matter. The objection which has been found in practice to applying such a composition to surfaces is that the coloring matter is not absorbed by the material of the surface but remains in the dried varnish so that when the varnish is worn or scratched from the surface the color is also removed giving to the surface an unattractive appearance.

The primary object of my invention is to provide a composition of matter for application to a surface which will simultaneously so color and finish the surface that the color will continue after the finish wears off.

A further object of my invention is to provide a surface finish which is simple in manufacture, inexpensive in cost, and easily applied, and which will impart to the treated surface an attractive and durable finish and color.

My invention, generally described, is a composition of matter consisting in wax, coloring matter, and a solvent, whereby when applied to a surface the coloring matter will be absorbed by the material of the surface, while the wax will adhere to the surface and give to it the desired finish. My improved composition also preferably contains an ingredient to harden the wax upon the surface and also an ingredient to attack varnish or other old finish which may have been previously applied to the surface.

In carrying out my invention I have found in practice that a composition of matter consisting in carnauba wax, ceresin wax, flowers of sulfur, butter of antimony, acetic acid, turpentine, benzol, and any suitable coloring matter when applied to the surface to be finished permanently imparts thereto the color of the matter used and simultaneously covers the surface with a durable finish.

While any desired relative proportions of the ingredients may be used I have found in practice that the following proportions produce good results:

| | |
|---|---|
| Carnauba wax | 14 pounds |
| Ceresin wax | 23 pounds |
| Flowers of sulfur | ¼ pound |
| Butter of antimony | 1/16 pound |
| Acetic acid | ¼ pound |
| Turpentine | 25 gallons |
| Benzol | 25 gallons |
| Acetone | 3 gallons | and coloring as desired.

I do not of course wish to limit myself either to the particular ingredients specified nor to the proportions of the ingredients but to their equivalents for the various ingredients and also any relative proportions which may be found suitable for the various different surfaces to which the composition may be applied.

In lieu of carnauba wax and ceresin wax, other of the mineral, vegetable or animal waxes may be used or varieties of gums may be employed as a substitute for either or both of the waxes.

The function performed by the flowers of sulfur, butter of antimony and acetic acid is to harden the wax upon the surface and these ingredients may be replaced by others which are capable of producing the desired result, namely that of hardening a superficial wax.

The benzol and acetone not only serve as solvents but also perform the function of dissolving varnish or other old finish which may have been previously applied to the treated surface. In lieu of benzol, equivalents may be used such as solvent naphtha, or coal tar naphtha. In lieu of acetone equivalents may be used.

Various characters of coloring matter may be used, such for instance as oil, anilin dyes, coal tar colors, pigments of all kinds, gilsonite, or asphaltums.

My composition of matter above described may be manufactured by melting in a kettle or mixing receptacle the carnauba wax and ceresin wax, and when thoroughly melted adding flowers of sulfur, butter of antimony, and acetic acid, and adding turpentine, then adding benzol, and finally adding the acetone and coloring matters as desired.

During the compounding of the ingredients the mixture should be continually stirred to thoroughly incorporate the several elements.

Other processes of compounding the composition matter may be followed and it is obvious that the coloring matter may be added at any time during the process of manufacture.

A composition of matter comprising ingredients above specified or their equivalents renders it possible to simultaneously color and finish a surface by merely applying thereto the composition and when finished the color is retained by the surface even though the hardened superficial wax becomes worn or scratched off.

Having now fully described my invention, what I claim as new, and desire to secure by Letters Patent, is—

1. A composition of matter for finishing surfaces consisting in wax, a solvent, coloring matter, and an ingredient for hardening the superficial wax composed of flowers of sulfur, butter of antimony, and acetic acid.

2. A composition of matter for finishing surfaces consisting in carnauba wax, ceresin wax, a solvent, coloring matter, and an ingredient for hardening the superficial wax composed of flowers of sulfur, butter of antimony and acetic acid.

3. A composition of matter for finishing surfaces consisting in carnauba wax, ceresin wax, coloring matter, turpentine, benzol, acetone, and an ingredient for hardening the superficial wax.

4. A composition of matter for finishing surfaces consisting in carnauba wax, ceresin wax, coloring matter, turpentine, benzol, acetone, flowers of sulfur, butter of antimony, and acetic acid.

5. A composition of matter for finishing surfaces, consisting of wax, a solvent, coloring matter, and flowers of sulfur.

6. A composition of matter for finishing surfaces consisting of wax, a solvent, coloring matter, flowers of sulfur, and butter of antimony.

In testimony whereof, I sign this specification in the presence of two witnesses.

PERCY NEYMANN.

Witnesses:
H. S. GAITHER,
C. C. CUNNINGHAM.